Nov. 18, 1924.  1,516,211

E. W. SAUNDERS

ANTISKID DEVICE FOR AUTOMOBILES AND OTHER VEHICLES

Filed May 19, 1924

INVENTOR
Edward W. Saunders.
By Bakewell & Cherch
ATTORNEYS

Patented Nov. 18, 1924.

1,516,211

UNITED STATES PATENT OFFICE.

EDWARD W. SAUNDERS, OF ST. LOUIS, MISSOURI.

ANTISKID DEVICE FOR AUTOMOBILES AND OTHER VEHICLES.

Application filed May 19, 1924. Serial No. 714,342.

*To all whom it may concern:*

Be it known that I, EDWARD W. SAUNDERS, a citizen of the United States, residing at St. Louis, Missouri, have invented a certain new and useful Improvement in Antiskid Devices for Automobiles and Other Vehicles, of which the following is a full, clear, and exact description, such as will enable others skilled in the art to which it appertains to make and use the same.

This invention relates to devices of the kind that are used on automobiles and other vehicles for preventing the wheels of the vehicle from skidding.

The object of the invention is to provide a highly efficient anti-skid device of simple construction that will cause a suitable granular material to be projected downwardly onto the ground at a point in proximity to a vehicle wheel, with sufficient pressure to insure said granular material being applied at a point where it will effectively prevent said wheel from skidding.

To this end I have devised an anti-skid device that consists of a receptacle or container for holding a quantity of suitable granular material, preferably sand or sawdust that is mixed with oil or some other suitable liquid so as to produce a viscous substance, a nozzle or nozzles arranged in proximity to one or more wheels of the vehicle, preferably at a point in close proximity to the ground and immediately in front of the rear wheels, and means for causing said material to be projected downwardly and rearwardly from said nozzles under sufficient pressure to insure said material being distributed over the ground at the point where the rear wheels contact with the ground in traveling forwardly, or sidewise in the event said wheels skid. In the preferred form of my invention, as herein illustrated, compressed air is used for discharging the granular material from the nozzle or nozzles, and means under control of the operator in charge of the vehicle is also provided for enabling said compressed air to be utilized to effect the escape of the granular material from the receptacle in which it is contained.

Figure 1:
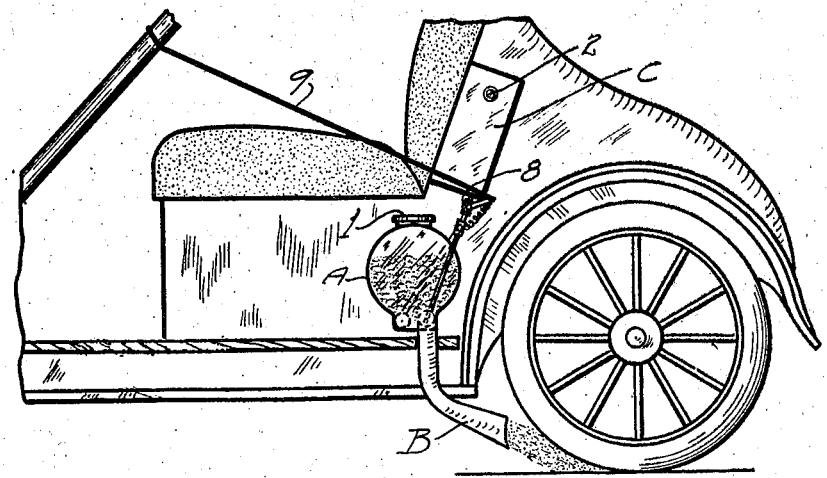
Figure 1 is a vertical longitudinal sectional view of a portion of an automobile equipped with an anti-skid device constructed in accordance with my invention.
Figure 2:
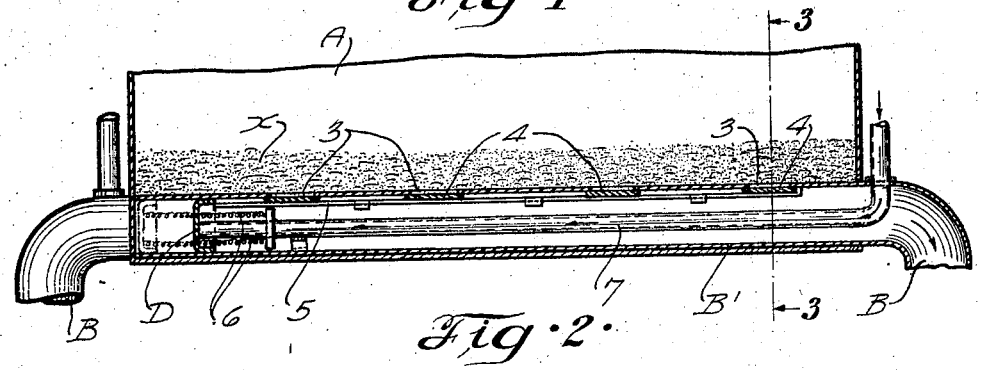
Figure 2 is a vertical longitudinal sectional view of the container or receptacle for holding the granular material.
Figure 3:
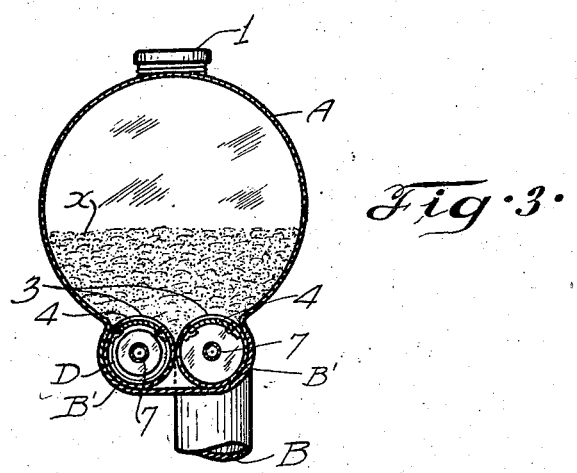
Figure 3 is a transverse sectional view, taken on the line 3—3 of Figure 2.

Referring to the drawings which illustrate the preferred form of my invention, A designates a receptacle or container of any preferred shape that is adapted to hold granular material $x$, such, for example, as sand or sawdust, or sand or sawdust mixed with oil or some other suitable liquid so as to produce a viscous substance, said receptacle being equipped with a filling opening that is normally closed by a removable cap 1. The receptacle A can be arranged at any suitable point on the vehicle, but when the device is used for preventing skidding of the rear wheels of the vehicle, it is preferable to arrange the receptacle A in front of and in close proximity to said rear wheels. In the form of my invention herein illustrated the receptacle A consists of a cylindrical tank that is arranged transversely of the vehicle, and two discharge spouts B are combined with said receptacle A in such a manner that the granular material $x$ in said receptacle can be conducted to said discharge spouts and discharged through same downwardly and rearwardly towards the ground at a point immediately in front of the contact surface of the rear wheels and the ground, as shown in Figure 1. Air under pressure is preferably used for discharging the granular material $x$ from the spouts B, and therefore, the vehicle is equipped with a compressed air tank C to which air under pressure can be supplied by any suitable means, the air tank of the device herein shown being equipped with an intake valve 2 to which an air filling hose can be connected when it is desired to fill the tank C with air. Each of the discharge spouts B is connected with a conduit B' that extends longitudinally of the receptacle A at the lower side of same and which is provided with one or more inlet openings 3 through which the material $x$ can enter said conduit from the receptacle A. Normally, the inlet openings 3 of each of the conduits B' are closed by slide valves 4 and means is provided whereby the operator in charge of the vehicle can effect the opening and closing of the valves 4 by manipulating a means that controls the escape of the air from the supply tank C. As shown in the drawings, particularly Figures 2 and 3, each of the conduits B' is equipped with a reciprocating piston D arranged adjacent the closed end of said conduit and connected to a rod 5 that is attached to the valves 4 which control the inlet openings 3 of said conduit, said piston D being normally maintained in the position shown in full lines in Figure 2 by means of a coiled contractile spring 6. Each of the conduits B' has arranged on the interior of same an air supply pipe 7 that leads to the air tank C, the inner end of said air supply pipe 7 terminating at such a point with relation to the piston D with which it co-operates that when the air is permitted to flow through the pipe 7 in the direction indicated in Figure 2 by the arrows on the pipe 7, the piston D will move to the left, looking at Figure 2, thus causing the valves 4 to be shifted into a position to uncover the inlet openings 3. As soon as the valves 4 open the material $x$ in the receptacle A will pass into the conduits B' and immediately thereafter said material will be conveyed through said conduits and discharged from the spouts B by the streams of air escaping from the air supply pipes 7. So long as communication between the air tank C and air supply pipe 7 is maintained, the valves 4 that govern the escape of the granular material $x$ from the receptacle A will be held in their open position and sufficient air will be supplied to the conduits B' to cause the material $x$ that enters same to be projected downwardly and rearwardly from the spouts B. As soon as the supply of air to the pipes 7 is cut off the pistons D will be restored to their normal position by the springs 6, thus causing the valves 4 to close and cut off the escape of the granular material $x$ from the receptacle A into the conduits B'. Any suitable means can be used for establishing and cutting off communication between the air tank C and the air supply pipes 7, such, for example, as valves 8 in the air supply pipes 7 that are adapted to be opened by exerting a pull on a cable 9 under control of the operator in charge of the vehicle.

An anti-skid device of the construction above described is reliable in operation, it is easy to install and maintain in operative condition and it will effectively prevent the wheels of a vehicle from skidding, due to the fact that it comprises means for discharging a granular material or a viscous substance under pressure at the point of contact between the wheels of the vehicle and the ground, said granular material being applied to the ground and to the tires on the wheels of the vehicle in such a way as to effectively prevent or arrest skidding of the rear wheels of the vehicle.

Having thus described my invention, what I claim as new and desire to secure by Letters Patent is:

1. An anti-skid device for vehicles, comprising a discharge spout arranged in proximity to a wheel of the vehicle, a receptacle for holding a granular material, a conduit associated with said receptacle and provided with an inlet opening through which the granular material can enter said conduit from said receptacle, a valve for controlling said inlet opening, a piston in said conduit for actuating said valve, and means for supplying air under pressure to said conduit so as to move said piston in a direction to open said valve and thereafter cause the granular material that enters said conduit to be conveyed to said spout and discharged therefrom.

2. An anti-skid device for vehicles, comprising a receptacle for holding granular material, a conduit provided with inlet openings through which the granular material in said receptacle can enter said conduit, a discharge spout at one end of said conduit arranged in proximity to a wheel of the vehicle, valves for controlling said inlet openings, and means for supplying air under pressure to said conduit so as to open said valves and thereafter cause the granular material that enters said conduit to be conveyed through same and discharged from said spout.

3. An anti-skid device for vehicles, comprising a receptacle adapted to hold a granular material, a conduit arranged at the lower portion of said receptacle and provided with inlet openings through which granular material can pass from said receptacle into said conduit, valves that normally close said inlet openings, a piston in said conduit for actuating said valves, a discharge spout at one end of said conduit arranged in proximity to a wheel of the vehicle, and means for supplying air under pressure to said conduit so as to move said piston in a direction to open said valves and thereafter cause the granular material that enters said conduit to be conveyed through same and discharged from said spout.

4. An anti-skid device for vehicles, comprising a receptacle for holding a granular material, conduits arranged at the lower portion of said receptacle and provided with inlet openings through which granular material can enter said conduits from said receptacle, each of said conduits being closed at one end and provided at its other end with a spout that is arranged in proximity to the ground in front of one of the rear wheels of the vehicle, valves for controlling said inlet openings, and means whereby the operator in charge of the vehicle can admit air under pressure to said conduits to effect the opening of said valves and to cause the granular material that enters the conduits to be conveyed through same and discharged from said spouts.

5. An anti-skid device for vehicles, comprising a receptacle adapted to hold a viscous substance, conduits arranged so as to receive the viscous sbustance contained in said receptacle and each provided with a discharge spout arranged in proximity to a rear wheel of the vehicle, valves for governing the passage of the viscous substance from said receptacle into said conduits, a compressed air tank, air supply pipes communicating with said tank and arranged inside of said conduits, pistons in said conduits for controlling said valves, and means whereby the operator in charge of the vehicle can cause air to escape from said air supply pipes to move said pistons in a direction to open said valves and to thereafter cause the viscous substance that enters said conduits to be conveyed through same and discharged from said spouts.

EDWARD W. SAUNDERS.